United States Patent Office 3,519,207
Patented July 7, 1970

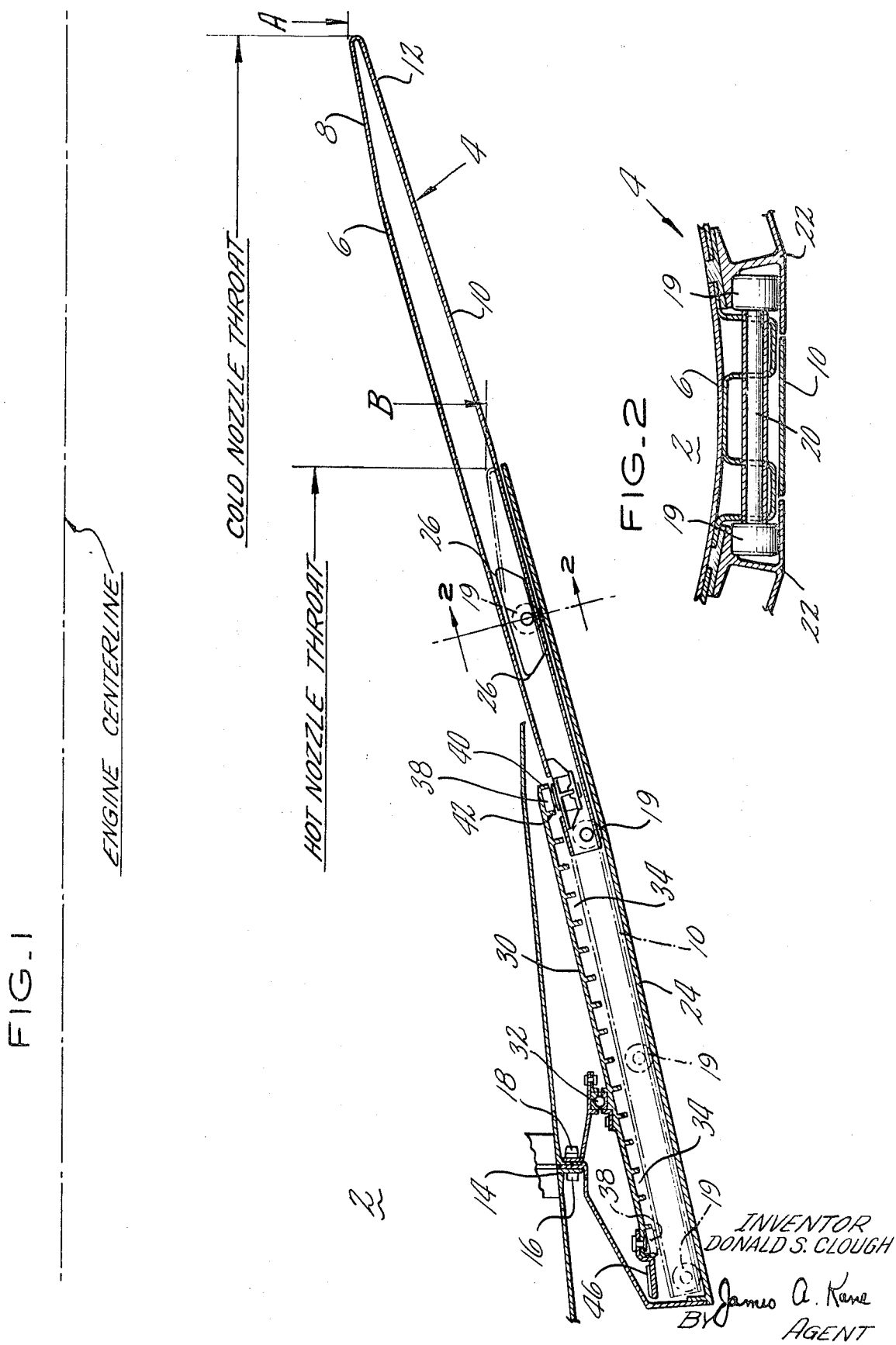

---

3,519,207
NOZZLE ACTUATION SYSTEM
Donald S. Clough, Andover, Conn., assignor to United Aircraft Corporation, East Hartford, Conn., a corporation of Delaware
Filed Sept. 20, 1968, Ser. No. 761,274
Int. Cl. B64c *15/06*
U.S. Cl. 239—265.41                                     10 Claims

ABSTRACT OF THE DISCLOSURE

An actuation system for a variable area nozzle wherein movement of the flaps is accomplished by an annular drive cone with spiral grooves around the circumference and over its length actuating a cam roller carried on each nozzle flap and cooperating within the spiral grooves.

BACKGROUND OF THE INVENTION

This invention relates to an actuation system for a variable area nozzle and is particularly adapted for use with an iris-type nozzle and the construction for varying the area thereof.

Variable area nozzles and iris-type nozzles are well known in the art and various constructions and arrangements are used to vary the area of these type nozzles. The conventional or prior art methods of actuating variable area nozzles, and in particular iris-type nozzles, are the use of air or hydraulic cylinders, or screw jacks attached to the nozzle segments or flaps. These constructions have been found to have a number of undesirable features, for example, they are space consuming and heavy because of the number of cylinders or jacks required. The present invention provides an actuation construction for the nozzle flaps which provides minimum distortion in operation, resulting in a relatively lightweight and effective system.

SUMMARY OF THE INVENTION

It is the primary object of the present invention to provide an actuation system for a variable area nozzle, wherein the actuation system for varying the area of the nozzle is contained within a limited space and is of a lightweight construction.

The present invention accomplishes the foregoing object by providing a drum which is preferably annular and is supported on a bearing or bearings from the engine housing. This annular drum which is preferably frustoconical in shape and has the larger diameter positioned at the upstream side of the drum contains a plurality of spiral grooves. These spiral grooves are positioned around the circumference of the conical drum and extend axially of the drum.

Positioned on each nozzle flap is a roller which cooperates within the spiral grooves contained on the conical drum. The preferred construction is this construction; however, it should be understood that either a single roller or any number of rollers may be employed.

The annular drum in this actuation system is the drive member, and rotation of the drum is caused by any conventional drive means such as a gear train driven by a hydraulic motor. Rotation of the annular drum causes the rollers to move axially of the drum within the spiral grooves contained on the drum. In the construction employed, the rollers are first driven in one direction by one shoulder of the grooves and then driven by the opposite shoulder of the groove when moving in the opposite direction. As a result, it has been found that in order to obtain an actuation system which will move the nozzle segments inwardly and outwardly, at least one more spiral groove shoulder than number of nozzle flaps is necessary.

An additional feature which contributes to the lightweight construction of the present invention is the fact that approximately one complete revolution of the drum causes each flap to complete its full stroke of expansion or retraction.

BRIEF DESCRIPTION OF THE DRAWINGS

FIG. 1 is a fragmentary sectional view showing a portion of a variable area nozzle and the device of the invention.

FIG. 2 is a sectional view taken substantially along the line 2—2.

DESCRIPTION OF THE PREFERRED EMBODIMENT

Referring now to FIG. 1, the aft end of a gas turbine engine is illustrated. Although the details of the engine are not shown, the engine is of a conventional design in which ambient air is drawn into a compressor and delivered in a compressed fashion to a burner section where heat is added, the air being delivered to a turbine section where work is extracted and then discharged through primary exhaust nozzle 2.

Primary exhaust nozzle 2 is of the variable area type, and in the present embodiment illustrated is a nozzle that is commonly called an iris type. Nozzle 2 includes flaps 4 which are movable axially and radially inwardly and outwardly thereby affecting the desired area change. During operation of the engine in normal horizontal flight, the position of variable area exhaust nozzle 2 is controlled or regulated in accordance with engine parameters to provide a program exhaust nozzle area as a function of selected engine parameters. The control of the area of exhaust nozzle 2 is accomplished by delivering an appropriate control signal to an actuator, herein later described which is in turn connected to the variable area exhaust nozzle 2. The control signal for regulating the area of the exhaust nozzle 2 may be derived, for example, from a control similar to that shown in U.S. Pat. No. 2,987,877.

As illustrated in the present embodiment, the nozzle 2 is an iris air-motor powered, variable area, convergent nozzle. It includes a plurality of flaps 4, and the flaps 4 and interflap seals (not shown) comprise the nozzle contour over the range of exit area settings. Each flap 4 consists of an inner surface 6 stiffened by a honeycomb construction 8 and a hat section 10 on the outer section 12 extending the length of the flap. The outer surface 12 of each flap 4 has a fairing strip over the top of the hat section to create a smooth aerodynamic surface. The basic nozzle flap 4 as herein described is a stress-limited box-type structure, and the maximum loading occurs under conditions of sea level, augmenter flame-out. Nozzle flaps 4 are assembled so that in the minimum jet area position, indicated by the letter A on FIG. 1, they are preloaded in a compressive hoop load at the tip by means of interflap wedge action. However, when operating, the compressor preload is relieved by the pressure load under flap 4 with essentially no charge in nozzle area. The maximum jet area position is indicated by the letter B on FIG. 1.

Iris nozzle 2 may be attached to an engine flange 14 by any conventional securing means, herein being illustrated as a plurality of bolts 16 and nuts 18. At the forward end of each flap, or more specifically, the upstream side of each flap 4 are rollers 19. These rollers are spaced axially from one another and are supported by shafts 20 mounted transversely in the hat section structure 10 of flaps 4. This is more clearly illustrated in FIG. 2. Rollers 19 move or ride in longitudinal parallel tracks 22 built into nozzle housing 24 of exhaust nozzle 2, the purpose of these tracks 22 being to guide the motion of flaps 4 as they retract or extend. As illustrated, the pressure loading reactions are transferred to case or housing 24 through rollers 19, while shoulders 26 on rollers 19 take maneuver load reaction and the torque reaction produced by nozzle actuation.

The actuation system for causing the flaps 4 to move from position A to position B comprises a drum 30 herein illustrated as being annular and frusto-conical in cross section. Drive-cone 30 is supported on bearing 32 which in turn is supported from the engine housing flange 14. The drive cone or drum 30 contains a plurality of spiral grooves 34 extending around its circumference and axially of drum 30. A cam roller 38 for actuation of flap 4 is installed on the inner surface of each flap 4 at the front end thereof. In the construction herein illustrated, at least one spiral groove on the drum 30 is required for each nozzle flap 4. However, since the actuation drive is provided by first one shoulder 40 of groove 34 and then the opposite shoulder 42 thereof, it is necessary to provide at least one more spiral groove shoulder than flaps employed. This enables the actuation or cam roller 38 to reverse directions and therefor either retract or expand each flap 4. An additional feature of the present construction is that for approximately one full turn of the drive member or drive drum 30, each flap 4 completes its full stroke of expansion or retraction. This provides a much lighter or lightweight constuction.

Internal ring gear 46 is located at the large end or forward end of the drive cone or drum 30 and is driven by a positive displacement gear-type air motor mounted on the engine housing. As shown, rotation of drum 30 through gear 46 driven by any conventional type motor, not shown, will cause the rollers 38 to follow down the spiral groove, thus retracting the nozzle segments. Extension of the flaps 4 is accomplished by reversing the motor.

It is to be understood that the invention is not limited to the specific embodiment herein illustrated and described but may be used in other ways without departure from its spirit as defined by the following claims.

What is claimed is:

1. An actuation system for a variable area nozzle including a plurality of radially and axially movable nozzle flaps comprising:
   an annular drum having a plurality of spiral grooves extending circumferentially around and axially of the drum;
   at least one roller connected to the nozzle flaps, the roller cooperating within the spiral grooves; and
   means for causing the drum to rotate, rotation of the drum causing the roller to move axially of the drum within the spiral grooves, this movement causing the nozzle flaps to move and vary the exhaust area of the nozzle.

2. An actuation system as in claim 1 wherein:
   the number of spiral groove shoulders is at least one greater than the number of nozzle flaps.

3. An actuation system as in claim 1 wherein:
   the number of rollers is equivalent to the number of nozzle segments.

4. An actuation system as in claim 1 wherein:
   the annular drum is frusto-conical in shape, the greater diameter of the cone being at the upstream side of the nozzle.

5. An actuation system as in claim 4 wherein:
   one complete revolution of the drum causes the nozzle flap to substantially complete its full stroke of expansion or retraction.

6. In combination an iris-type nozzle for a gas turbine engine, the nozzle including a plurality of nozzle flaps which are movable in a radial and axial direction so as to vary the exhaust area of the nozzle, and apparatus for causing the nozzle flaps to move and vary the exhaust area of the nozzle wherein the improvement comprises:
   a drive member having a plurality of spiral grooves extending circumferentially around and axially over the drive member,
   means for supporting the drive member from the nozzle,
   at least one roller connected to the nozzle flaps and cooperating with the spiral groove, and
   drive means for rotating the drive member, rotation of the member causing the roller to move axially of the drive member within the spiral grooves, translation of the roller within the spiral groove causing the nozzle flaps to move axially and radially so as to vary the exhaust area of the nozzle.

7. The combination as in claim 5 wherein:
   the number of spiral groove shoulders is at least one greater than the number of nozzle flaps.

8. The combination as in claim 5 wherein:
   the number of rollers is equivalent to the number of nozzle flaps.

9. The combination as in claim 5 wherein:
   the annular drum is frusto-conical in shape, the greater diameter of the cone being at the upstream side of the nozzle.

10. An actuation system as in claim 9 wherein:
    one complete revolution of the drum causes the nozzle flap to substantially complete its full stroke of expansion or retraction.

References Cited

UNITED STATES PATENTS

| | | | |
|---|---|---|---|
| 2,926,491 | 3/1960 | Hyde | 239—265.41 |
| 3,044,258 | 7/1962 | Carlton et al. | 239—265.39 X |

M. HENSON WOOD, Jr., Primary Examiner

J. J. LOVE, Assistant Examiner

U.S. Cl. X.R.

239—265.19, 265.33